United States Patent [19]

Oswald et al.

[11] 4,123,997
[45] Nov. 7, 1978

[54] MOTOR ADAPTED FOR FUEL COMPRISING A PRODUCT DIFFERENT FROM MINERAL OIL PRODUCT

[75] Inventors: Roger Oswald; Georges Agache, both of Le Havre, France

[73] Assignee: Etablissement Public die: Agence Nationale de Valorisation de la Recherche, France

[21] Appl. No.: 775,039

[22] Filed: Mar. 7, 1977

[30] Foreign Application Priority Data

Mar. 8, 1976 [FR] France ................. 76 06510

[51] Int. Cl.² ............................................. F02B 75/12
[52] U.S. Cl. .................... 123/1 A; 123/32 JT; 123/180 AC
[58] Field of Search ................. 123/1 A, 30 B, 32 JT, 123/180 AC, 179 G, 187.5 R, 27 GE, 127

[56] References Cited

U.S. PATENT DOCUMENTS

| 1,160,966 | 11/1915 | Zeitlin ................. 123/78 F |
| 1,549,642 | 8/1925 | Wilbur ................. 123/180 A X |
| 1,659,621 | 2/1928 | Woolson ............... 123/180 AC |
| 2,876,750 | 3/1959 | Carr ..................... 123/1 A |
| 2,883,276 | 4/1959 | Larsen ................. 123/1 A X |
| 2,889,819 | 6/1959 | Lockheed ............. 123/127 X |
| 2,907,308 | 10/1959 | Meurer et al. ....... 123/30 B |
| 3,196,859 | 7/1965 | Zeigler ................ 123/32 JT X |
| 3,749,376 | 7/1973 | Alm et al. ........... 123/1 A X |
| 4,024,848 | 5/1977 | Lee ..................... 123/1 A X |

FOREIGN PATENT DOCUMENTS 540,570 8/1955 Belgium ................. 123/1 A

Primary Examiner—Ira S. Lazarus

[57] ABSTRACT

The engine has a device for injecting fuel, preferably at high pressure, into the cylinder of cylinders, a device adjusting the injection advance in dependence on the load, and a controlled ignition device, the said engine being arranged to use a fuel other than a petroleum product, preferably an alcohol based product, and being characterized in that its dimensional characteristics are determined to supply a volumetric compression ratio between 12 and 20, preferably between 15 and 18 and in particular close to 16, and in that the device adjusting the injection advance is such that it supplies, at least for starting, a high value of advance, particularly of the order of 180°.

5 Claims, 8 Drawing Figures

MOTOR ADAPTED FOR FUEL COMPRISING A PRODUCT DIFFERENT FROM MINERAL OIL PRODUCT

The present invention relates to an engine utilising a fuel which is a product other than a petroleum product, particularly an alcohol, such as methanol. An engine of this kind permits almost complete elimination of polluting substances in the exhaust gas emission.

The invention relates more particularly to a piston engine fed by a carburettor, a low pressure (LP) injector, or a high pressure (HP) injection pump associated with each cylinder, the said motor being capable of burning various fuels comprising products other than petroleum products, and particularly fuel having a high heat of vaporization, for example pure or denatured methanol alone or mixed with conventional petroleum fuels or with other lower aliphatic alcohols.

It is well known that increasing use is being made of motorised vehicles or of equipment having an engine, which are generally provided with an engine fed with petroleum products. An engine of this kind belongs to the class of internal combustion engines, whatever the cycle thereof, this class comprising controlled ignition carburettor engines and self-ignition diesel engines. Such engines increase pollution of the atmosphere, because their exhaust gases contain toxic substances, such as carbon monoxide and oxides of nitrogen. Numerous techniques have been applied in the attempt to reduce the production of polluting substances in the exhaust gases by making modifications to existing engines, but have not been successful in achieving complete elimination of these toxic substances. Furthermore, they often reduce the thermal efficiency of the engine.

Tests have also been made in burning in heat engines fuels other than petroleum products, for example fuels based on alcohols, but hitherto efficiency has not been satisfactory and the operation of the engine, particularly as regards starting from cold, has been problematical.

The invention proposes an engine consuming fuels comprising products other than petroleum products and having excellent thermal efficiency; this results in the absence of unburned material and almost complete elimination of toxic or corrosive gaseous constituents in the engine exhaust gases when fuels having a high heat of vaporization are burned in this engine.

At the present time the two main categories of engines used are controlled ignition (petrol) engines and self-ignition (diesel) engines.

The petrol (controlled ignition) engine has an external carburation device, such as a carburettor, or a low or medium pressure injection pump for preparing the carburetted mixture externally of the cylinders. An engine of this kind is provided with a controlled ignition device, for example comprising sparking plugs, and its volumetric compression ratio is normally between about 7 and 9. In the construction of these engines up to the present time volumetric compression ratios of 10 have never been exceeded, while ratios of about 10 have been achieved only experimentally. Petrol, even of the best quality with the highest octane number (commercial), will in fact accept so high a ratio as 10 only if the actual ratio is low and the apparent (or geometric) ratio is high. This is the case with very advanced engines rotating at very high speeds.

In a diesel engine, air is mixed with the fuel inside the cylinder with the aid of a high pressure injection pump and with self-ignition of the fuel mixture at the end of the compression stroke. The volumetric compression ratio varies from 14 to 23 depending on the size of the engines and their rotational speed. High speed diesel engines of the automobile kind usually have volumetric compression ratios of about 20.

In a general aspect the invention relates to an internal combustion engine having in particular a preferably high pressure device for injecting fuel into the cylinder or cylinders, a device for adjusting the injection advance in dependence on the load, and a controlled ignition device, the engine being arranged to use a fuel comprising a product other than a petroleum product, preferably based on an alcohol, and being characterized in that the device for adjusting injection advance is such that is supplies, at least for starting, a high value of advance, particularly of the order of 180°.

Accordingly to the invention the device for adjusting injection advance is designed to reduce the advance when the load increases.

The fuel used in the engine of the invention comprises a fuel having a high heat of vaporization, particularly one selected from the lower aliphatic alcohols, such as methanol, ethanol, propanol, or isopropanol and the butanols.

No engine known at the present time either of the controlled ignition type or of the self-ignition (diesel) type is able to burn with acceptable efficiency fuels having a high heat of vaporization.

If in fact methanol is burned, for example in an engine whose volumetric compression ratio is equal to 10, the proportion of unburned material is excessive and thermal efficiency is poor. If methanol is burned in a diesel engine whose ignition system has been converted to controlled ignition and whose volumetric compression ratio is from 20 to 22, this ratio is too high for methanol and satisfactory thermal efficiency is not achieved.

In addition, the combustion chamber designed for self-ignition is generally not utilisable for controlled ignition, which is essential for the ignition of fuels of the alcohol type.

According to the invention the engine fed with lower aliphatic alcohol has dimensional characteristics determined to supply a volumetric compression ratio between 12 and 20 and preferably between 15 and 18, this ratio being sufficient for combustion to be complete. A ratio of about 16 corresponds to an optimisation ratio for an engine utilising methanol for the operating conditions generally occurring in automobiles. In this case the overall thermal efficiency decreases both above and below this ratio.

When methanol is burned in an engine which is constructed in accordance with the invention and whose volumetric compression ratio is 16, good thermal efficiency is obtained which is constantly higher than the efficiency of the "petrol" engine and is very close to that of the "diesel" engine (about 2000 K calories per CV per hour) in the automobile range.

In the engine according to the invention combustion with optimum efficiency is obtained without the use of a heat exchanger, and therefore without external heating of the air, of the fuel, or of the mixture.

Because of the high heat of vaporization of the fuel used in the engine according to the invention, considerable cooling occurs at the moment of the atomization of the fuel, or at the moment when the carburetted mixture is formed. During the travel of the carburetted mixture is may therefore be advantageous to attempt to achieve the longest heat exchange time between the fluids constituting the mixture. Furthermore, it is important that before the ignition the carburetted mixture should attain an adequate end of compression temperature to make it possible to achieve easy ignition of the carburetted mixture, particularly in order to ensure normal starting of the engine and good running at low load. This end of compression temperature depends on the compression ratio, on the characteristics of the fuel used (heat of vaporization), and on the method of feeding the engine.

The feeding of the engine is normally achieved by one of the following three means:

(1) Conventional carburettor: The primary calories are supplied by the heat of the ambient air drawn in and by the progressive heating of the walls of the carburettor and of the piping, resulting from the normal heating of the engine. At the end of a certain period of operation the suction temperature finally becomes relatively high in relation to the atmosphere.

(2) "Low pressure" injection: A variant of conventional carburation in which it is advantageous to apply multi-cylinder feeding.

(3) "High pressure" injection: This is the arrangement that will be preferred, without the other methods of feeding being rejected. This method of feeding provides the advantage of giving a precise injection point in the cycle as well as precise metering of the fuel. It is also the method of injection which makes it possible to achieve optimum injection advance in conformity with the time necessary for obtaining the best temperature exchange. It is the injection method which makes it possible to obtain the best efficiency, because finally, due to the injection advance, it makes it possible for the cooling effect and therefore the calorie exchange time to be perfectly corrected. For good efficiency of an engine burning methanol with a volumetric compression ratio of 16 the injection advance may attain 180°, that is to say half a revolution, before ignition, for the purpose of starting and at very low loads; on the other hand, for higher loads and engine speeds this injection advance will be automatically reduced by a conventional centrifugal device, which however provides a variation towards delay.

Depending on the type of operation desired, that is to say an automobile type engine, a highly developed type of engine, or a slow type for fixed or marine installations, of the two-stroke or four-stroke type, the invention proposes a means of determining the characteristics of the engines to be constructed. Other characteristics and advantages will be seen from the description given below of various embodiments permitting the utilisation of the process of the invention, this description being given by way of example without limitation and with reference to the accompanying drawings, in which.

Figure 1:
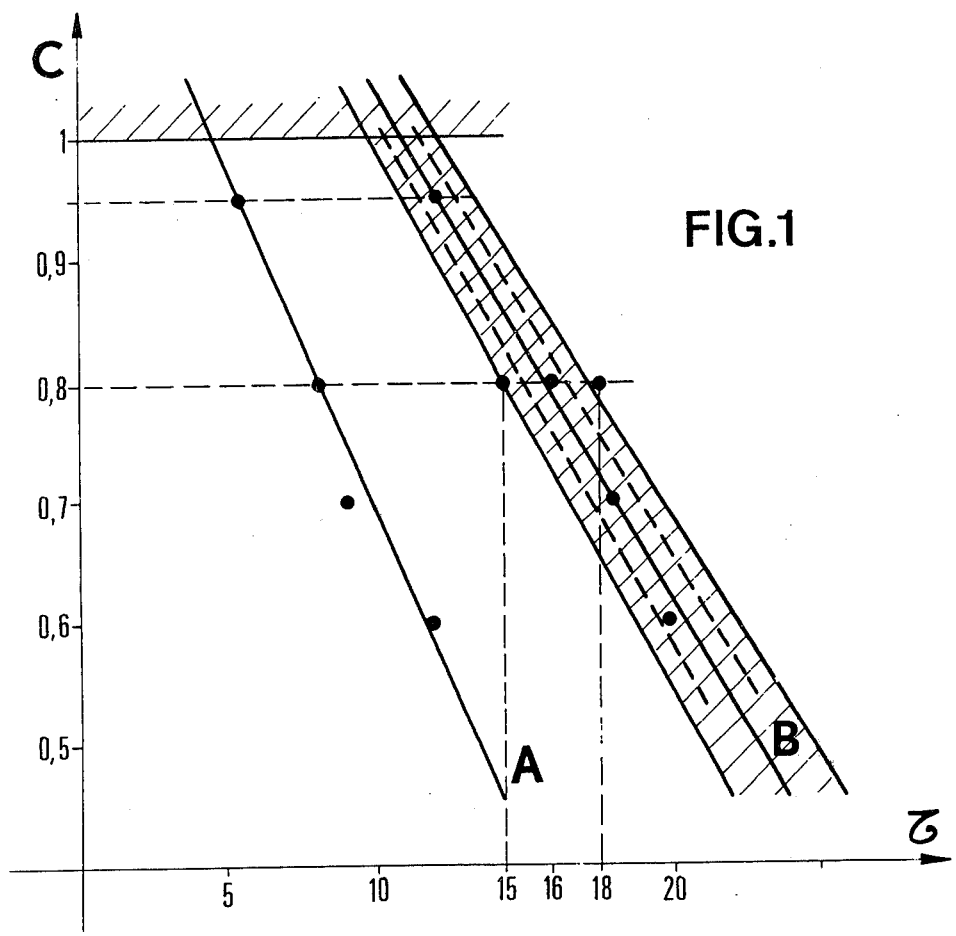
FIG. 1 is a graph showing mean curves of compression ratios for various fuels, plotted against the factor C defined hereinbelow.

In the preferred embodiment of the invention the fuel is methanol.

Methanol has physicochemical properties different from those of petroleum products, particularly gas oil and petrols. The properties of methanol, which are described in detail below, entail necessary fundamental changes to known engines in order to produce an engine producing mechanical energy with optimum efficiency by burning methanol.

The description below is given more particularly for an engine burning methanol, but it is quite obvious that it also covers engines burning other fuels selected from the lower aliphatic alcohols, either pure or in mixtures. In the course of the description information will be given when the properties of aliphatic alcohols other than methanol will be different from those of methanol.

100% pure methanol, which may or may not be denatured, is preferably used. It is also possible to use methanol mixed with miscible petroleum products, in any proportion.

Nevertheless, the octane number resulting from the mixtures varies from about 80 (number of the base petroleum product) to an octane number considerably higher than 100, as the proportion of pure methanol increases.

Since the octane number has an influence on the fundamental characteristics of the engine, when determining these characteristics at the design stage it is therefore necessary to make a choice depending on the fuel. Once the choice has been made and the optimised engine has been built, it will no longer be possible to use a fuel having very different physiochochemical characteristics.

In an engine optimised for methanol it will in fact be as inappropriate to burn petrol in it as to attempt to use methanol in an existing engine designed for petrol; this would result in abnormally high consumption of fuel.

The cetane number of methanol is practically zero in relation to that of heavy oils, as is also the case with petrol; it is therefore necessary to utilise controlled ignition, particularly ignition by means of sparking plugs, because there is no self-ignition at the compression ratios of 16 which are used and which are recommended for maximum efficiency.

A test has been made with a compression ratio of 22 and no self-ignition occurred; controlled ignition therefore becomes obligatory.

The threshold of the heat of vaporization of methanol is much higher than that of petrol, which is one of the causes of the different construction of alcohol engines and engines for petroleum products.

The heat of vaporization is in effect 80 calories per gram for petrol, 164 calories per gram for propyl alcohol, 204 calories per gram for ethanol, and 284 calories per gram for methanol. The orders of magnitude are therefore 80 on the one hand and 200 on the other hand, thus entailing considerable differences between the characteristics of an engine according to the invention and engines already in use.

The engine of the invention is suitable for propyl alcohol, that is to say for values ranging from 150 calories per gram and considerably beyond 284 calories per gram, the latter value corresponding to the heat of vaporization of methanol. As previously indicated, it should be noted that starting from a certain latent heat of vaporization the adaptations made for alcohols will no longer permit the use of petrols.

The high value of the heat of vaporization of the fuel used according to the invention results in considerable cooling at the moment when the fuel is atomized or at the moment when the carburetted mixture is formed. Apart from the high compression ratio, provision is made to correct the cooling effect either by maximum elongation of the heat exchange time (carburettor, LP injection), or by a large injection advance in the case of HP injection. In the latter case, by adjusting the value of the admission advance of the fuel it has been found in tests that it is possible to operate with methanol with compression ratios of the diesel type of the order of 20 simply by increasing the value of the injection advance in comparison with that for diesel engines. In this case it is obvious that the method of ignition must be changed by providing the diesel engine with controlled ignition. Nevertheless, in order to obtain an engine which is more flexible and permits heavier overloads, the ratio of 16 appeared to be an optimum, and in this case and for the direct high pressure method of injection the injection advance is of the order of 180°, that is to say one half-revolution before ignition.

The volumetric compression ratio must be selected at about 16 and more generally between 15 and 18, in order to take into account the methods of fuel supply (preferably 15 for a carburettor and preferably 17 to 18 for HP injection) and in order to obtain maximum efficiency in a conventional automobile engine with controlled ignition and fed with methanol, in comparison with engines of the same class fed with petrol and using a compression ratio of the order of 7 to 9.

For another engine, for example a slow engine running at 1000 revolutions per minute, and generally heavier, the optimum ratio may be 12 with methanol.

In the designing of the engine according to the invention it appears useful to study the coefficients or indices of similitude between engines in dependence of the fuels used.

By way of example a first index C has been defined, which is always lower than 1 and which is the ratio $C_a/C_g$ of the value of the active stroke $C_a$ of the piston in the cylinder during the compression phase to the value of the geometric or constructive stroke $C_g$ of the piston in the cylinder.

This index C constitutes a characteristic of an engine which may be either a 2-stroke or 4-stroke type, and which may be a slow engine or a high speed engine, an automobile engine, or a motorcycle engine.

This index varies from 0.5 to 1. It is 0.95 for a heavier slow engine; 0.80 for a conventional automobile engine; 0.70 for a highly developed very high speed engine.

By introducing the notion of different fuels, it is possible to establish the following table of the values of C and of compression ratios for fuels having a high octane number, such as (ordinary and super) petrol and methanol. For heavy oils it would be possible to plot a third series of curves, in which case however the cetane number would be introduced.

| C | Optimum compression ratio (mean values) | |
| --- | --- | --- |
| | Super petrol | Pure methanol |
| 0.95 | 5 to 6 | 12 (11 to 13) |
| 0.80 | 7 to 9 | 16 (15 to 18) |
| 0.70 | 9 to 10 | 18 (17 to 20) |
| 0.60 | 12.5 | 20 (19 to 22) |

FIG. 1 shows the mean curves of the compression ratios $\tau$ (on the abscissa) plotted against $Ca/Co = C$ (on the ordinate for various fuels).

These curves have been plotted from measurements made in different engines fed with high octane number fuels, with super petrol for curve A and with methanol for curve B.

The value C = 0.95 corresponds to a slow four-stroke engine; C = 0.70 corresponds to a highly developed four-stroke engine, and the last value of C = 0.60 corresponds to a motorcycle equipped with a 19 HP, 8800 rpm SACHS engine. The figures shown in the Table were all taken from an experimental model fed with these two fuels.

The hatched zone containing the curve B corresponds to the zone of optimum efficiency of an engine fed with methanol; the corresponding values on the abscissa are therefore the most expedient compression ratios.

A (hatched) zone has been defined between two end curves, because for a determined value of C the compression ratio varies, for optimum efficiency, in dependence on the method of ignition of the carburetted mixture. Thus, for a four-stroke engine with controlled ignition having a ratio C = 0.80, that is to say for a conventional automobile engine, the mean compression ratio will be 16 with methanol; it will preferably be 15 with a carburettor and 17 with a high pressure injection pump. This can be seen from the curves in broken lines plotted between the two limit curves. Under these conditions the theoretical efficiency will be optimum. For a selected fuel these considerations thus make it possible to determine for a given C the best compression ratio corresponding to a determined method of ignition.

A comparative study of engines in dependence on the fuels used leads to taking into account a factor $\theta_f$ which is of great importance, $\theta_f$ being the final temperature obtained in the cylinder at the end of the compression of the carburetted mixture. It has been indicated that this temperature depends on the method of feeding the engine (temperature of air drawn in), of the compression ratio which in turn depends on C, and on the fueld used (heat of vaporization). It should be observed that for a determined fuel this necessary temperature $\theta_f$ is a constant, having regard to the physicochemical properties of the fuel and in particular to the latent heat of vaporization. This has the consequence that if the air drawn in remains at a temperature which, for exaple, is close to atmospheric temperature the compression ratio is automatically determined in accordance with the value of the heat of vaporization of the fuel, and consequently the ratio C, in dependence on the type of engine selected — a slow engine, conventional automobile engine, or high performance engine.

This temperature $\theta_f$ must be controlled at every moment and must not exceed the ignition temperature $\theta_i$ of the fuel, failing which, if the compression ratio remains constant, there is a risk of harmful side effects on thermal efficiency (self-ignition, knocking, etc.).

The same is true of starting from cold. If it is desired that the engine should start in cold weather on the first rotation of the crankshaft, it is necessary that from the outset of this temperature $\theta_f$ should be close to $\theta_i$, failing which the engine will not start. The engine does not make provision for the utilisation of previous external heating of the air or fuel, or of the carburetted mixture, before introduction into the cylinder, with the aid of a heat exchanger, because at the time when these calories are required they are not available.

On the contrary, making use of compression only, the value of the heating is known exactly. Furthermore, in this last case, the mixture introduced in the cold state into the cylinder and then compressed is considerably more dense than when introduced in the hot state into the cylinder.

The physicochemical characteristics of a fuel according to the invention necessitates substantial differences between an engine burning these fuels and an engine fed with petroleum products.

The dimensioning of the engine must be calculated in dependence on the requirements which have to be taken into account in order to obtain good efficiency, that is to say a high compression ratio, controlled ignition and, in the case of high pressure injection, injection advance greater than that utilised in a diesel engine, and in the case of the other methods of feeding an ignition advance greater than that which is utilised for petrol.

With regard to the combustion chambers, two completely different classes of chamber already exist, depending on whether the fuels have a high octane number or a high cetane number. With methanol it is necessary to consider a new class of combustion chamber which takes into account a high compression ratio, the speed of flame propagation, which is slower, and also ignition times which are a little longer.

In combustion chambers which have been designed for methanol it has been attempted to obtain chambers of revolution having a semi-lenticular or lenticular shape, with an ignition device comprising, for example, a sparking plug whose position is central, along the axis, or parallel to the axis of the cylinder, and whose inclination is preferably below 30°.

Figure 2:
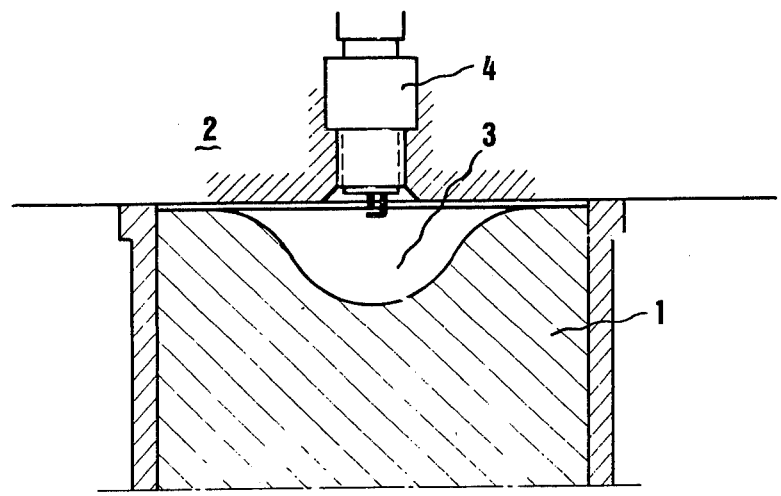
FIG. 2 is a diagram of a combustion chamber of an engine according to the invention.

In FIG. 2 a combustion chamber having a semi-lenticular shape is shown. The piston 1 and a cylinder head 2 are shown diagrammatically. This cylinder head is substantially flat, while the piston has a bowl-shaped cavity 3. In the example illustrated the diameter of the bowl is of the order of two-thirds of the bore, and the depth of the bowl (around it in FIG. 2) defines a combustion chmaber supplying a combustion ratio determined in the manner described with reference to FIG. 1, depending on the final combustion temperature and the method of feeding. In the example illustrated the sparking plug 4 is disposed on the axis of symmetry of the combustion chamber, but it could also be offset in the lateral direction towards one side or the other.

Figure 3:
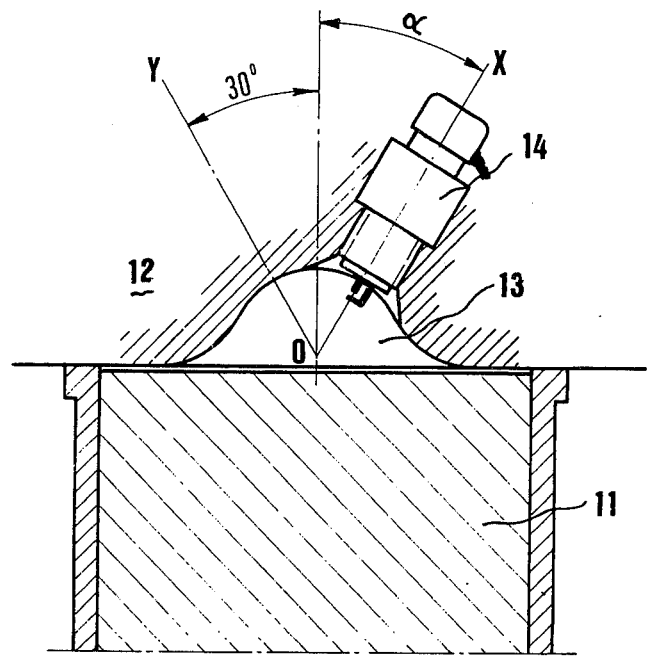
FIG. 3 is a diagram of a modified combustion chamber of an engine according to the invention.
Figure 4:
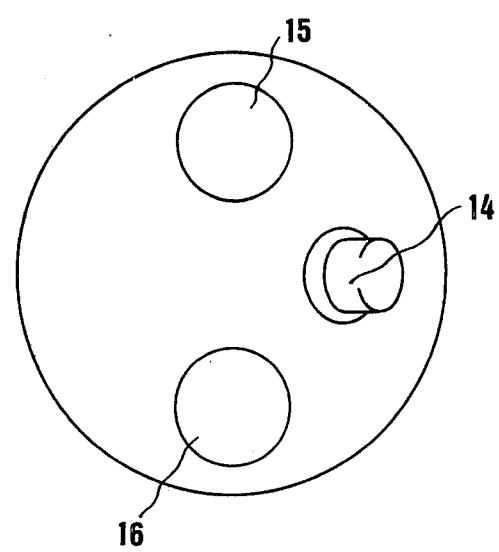
FIG. 4 is a view in cross-section corresponding to the chamber of FIG. 3.

FIGS. 3 and 4 show a modified combustion chamber for an engine according to the invention, this chamber having a semi-lenticular shape as in FIG. 2. In this modified embodiment the combustion chamber is formed in the cylinder head 12, while the piston 11 has a substantially flat upper face. The bowl 13 has moreover the same relative dimensions as the bowl 3 in FIG. 2. In this modified embodiment the sparking plug 14 is inclined obliquely in relation to the axis of the piston and of the chamber, forming with that axis an angle $< 30°$. The axis of the sparking plug can therefore assume positions between the axis OX and OY, forming angles of 30° on each side of the axis of symmetry. FIG. 4, which is a cross-section corresponding to FIG. 3, shows by way of illustration the position of the valves 15 and 16 and that of the sparking plug 14.

Figure 5:
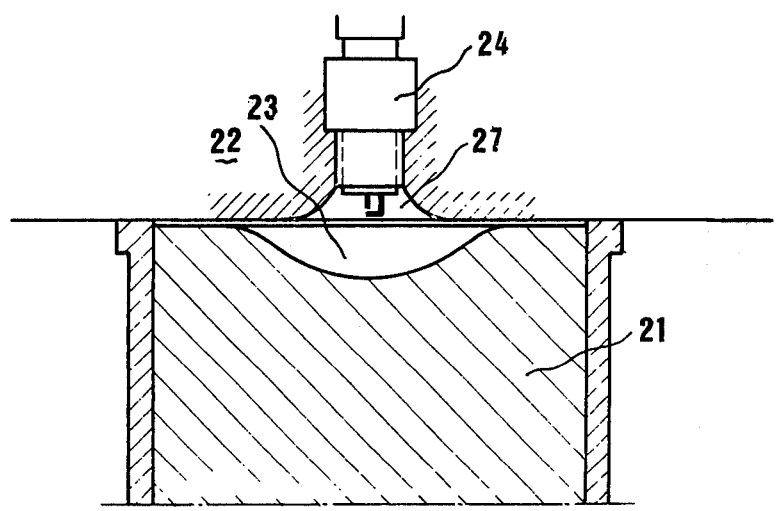
FIG. 5 is a diagram of a combustion chamber of lenticular shape according to the invention.
Figure 6:
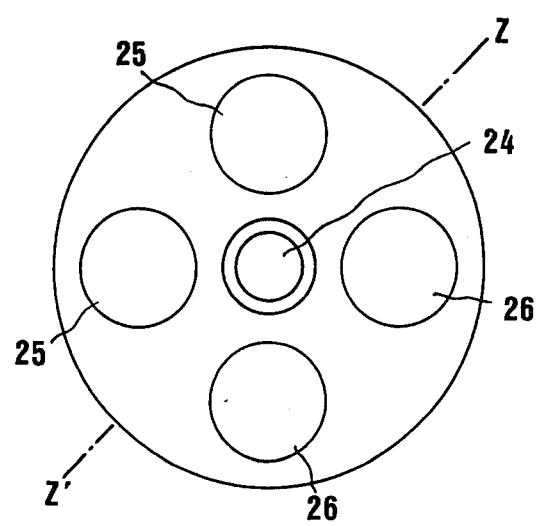
FIG. 6 is a view in cross-section corresponding to the chamber of FIG. 5.

FIGS. 5 and 6 show a combustion chamber of lenticular shape. In this example the piston 21 has in its upper face an axially symmetrical cavity 23. Similarly, the cylinder head 22 has a cavity 27 disposed facing the cavity 23. The volume represented by the cavities 23 and 27 together forms a combustion chamber whose total volume must correspond to the combustion ratio. In this example the sparking plug 24 is disposed axially.

FIG. 6, which corresponds to FIG. 5, shows the axial arrangement of the sparking plug 24 and the symmetrical arrangements in pairs of the two admission valves 25 and two exhaust valves 26, the trace of the longitudinal plane of the engine being represented by the line z'—z.

The diagrammatical representations described above are sufficient to enable those skilled in the art to understand the structure of the combustion chambers of the engine of the invention.

The relative positions of the sparking plug and injector are not critical, but the arrangement for obtaining optimum efficiency consists in placing the sparking plug in the manner shown in FIG. 2, that is to say in the axis of the combustion chamber or along a line parallel to the axis of the cylinder, or in all cases inside a cone having a total opening of 45° to 60° at the apex, the axis of which cone is substantial parallel to the cylinder. With regard to the injector, its position is not at all critical; its position may be selected so that its jet of atomized fuel does not arrive so as to cool directly the sparking plug or ignition device.

The fact that the sparking plug or the ignition system is placed in the axis of the combustion chamber, or substantially parallel thereto, entails positioning of the valves 15 and 16 (in a 4-stroke engine) on each side of the plug 14, in cases where the method of fuel feed utilises a carburettor. In cases where high performances are desired, and when it is necessary to increase the flow of fluids in circulation, the valves could be grouped in two pairs as shown in FIG. 6, that is to say two parallel valves for admission and two parallel valves for exhaust.

It will be recalled that if a considerable ignition advance is provided when the feed means comprises a carburettor, a heavy injection advance must be provided when injectors are used, because of the high value of the heat of vaporization. For an engine whose compression ratio is 16 an injection advance is provided which may amount to half a revolution before ignition, thus permitting starting from cold and/operation with low loads and at low engine speeds. If the injection advance or ignition advance remains at the value adopted for petrol, a very marked fall of power and performance is found, because the delay in the ignition of the air-methanol mixture is longer and the flame propagation speed slightly lower. The power-to-weight ratio or weight-to-power ratio is increased by from 30 to 35%, acceleration is substantially more powerful, operation much more flexible, and great ability to take overloads, particularly at low engine speeds, is found.

The efficiency of the engine of the invention is higher than that of the petrol engine and substantially equal to that of a diesel engine, while being much less noisy than a conventional diesel engine. In addition, the exhaust gases of this engine are colourless, odourless, and give rise to very little pollution.

In the foregoing the particular case of the utilisation as fuel of methanol in the practically pure state has been studied. However, although it is actually possible to contemplate the utilisation of pure alcohol, and in particular pure methanol, as fuel, the practical evolution of engines towards this solution will probably be able to take place only progressively, having regard to the conversions to be made to conventional engines designed for petroleum fuels. It is therefore also necessary to consider the problem of the utilisation of alcohols mixed with conventional petroleum fuels, both with a view to reducing the consumption of the latter and with a view to reducing atmospheric pollution caused by exhaust gases.

The present invention therefore also has as an object the extension of the results obtained hereinabove to the case of the utilisation of a mixture in variable portions of conventional fuel, such as petrol, with an alcohol such as methanol.

In the foregoing a graph has been used to define the means of selecting the optimum volumetric compression ratio T to be achieved in the engine, this ratio then being used to determine the dimensional characteristics of the engine. This optimum rate is given in dependence on a coefficient C, which is always lower than 1 and which is the ratio Ca/Cg of the value of the active stroke Ca of the piston in the cylinder during the compression phase to the value of the geometric or constructive stroke Cg of the piston in the cylinder.

Figure 7:
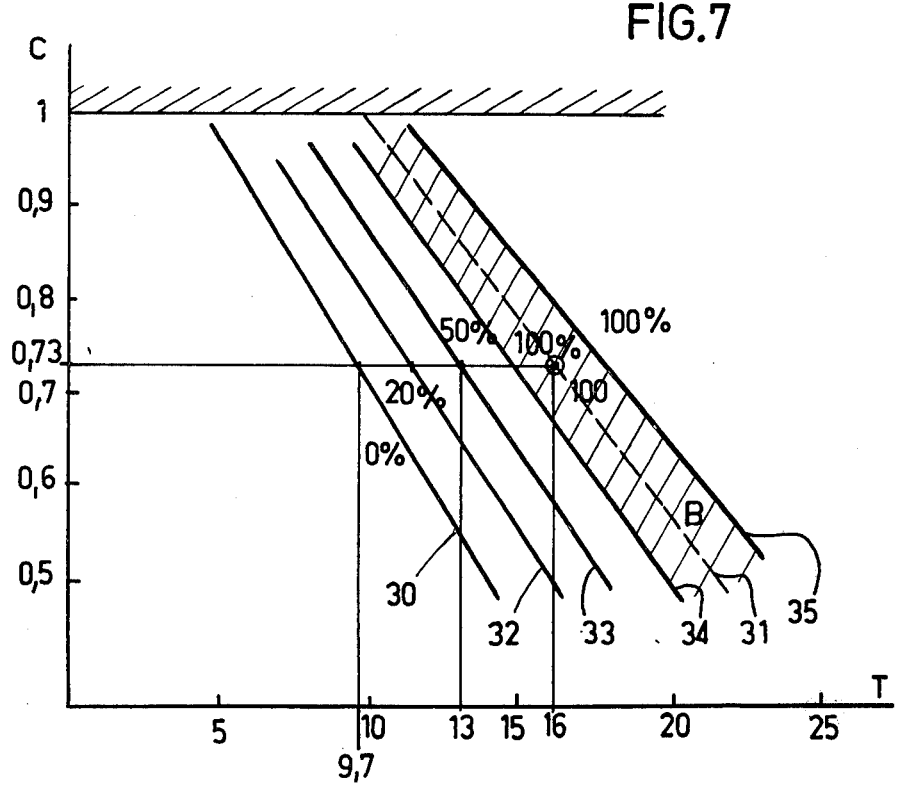
FIG. 7 is a graph similar to the graph in FIG. 1 for mixtures of petroleum fuel with methanol in variable percentages.

This index C constitutes a characteristic of a motor, whether it is of the two-stroke or four-stroke type, whether it is a slow engine or a highly developed engine, or an automobile or motorcycle engine. The graph given in FIG. 7 here also makes it possible to select the optimum compression ratio for a motor whose coefficient C is known, in dependence on the composition of the fuel mixture. The curve 30 corresponds to the case of a pure conventional petroleum fuel, for example super petrol having a high octane number. The curve 31 is a mean curve which on the contrary corresponds to the case of the utilisation of pure methanol. The intermediate curves 32, 33 . . . correspond to mixtures defined by their percentage of methanol; thus, curve 30 corresponds to 0% and the curves 31, 34, and 35 to 100% of methanol, while the curve 34 corresponds to feeding with a carburettor and curve 35 to injection. As an example, for a value of C = 0.73 there will be an optimum compression ratio T of 9.7 for pure petrol, 16 for pure methanol, and 13 for a 50% mixture of both.

The addition, mixed with petroleum products, of a liquid containing oxygen in its chemical formula makes it possible to achieve complete combustion and improved energy efficiency, and finally reduced pollution to a minimum.

On the other hand, however, the use of mixtures of alcohol and petroleum product entails subsidiary problems of its own, particularly the need to avoid the phenomena known under the names of unmixing, percolation, and vapour lock.

Unmixing is the tendency of the two liquids, alcohol and petrol, to separate; the larger the amount of water contained in the mixture, the more pronounced this phenomenon will be.

Percolation is nascent boiling of the methanol component in the mixture, due to the fact that methanol has a rather low boiling point. The phenomenon of vapour lock may also occur; this also occurs with petrol in very hot weather and gives rise to the blocking of the carburettor through the formation of a plug or block of vapour.

Figure 8:
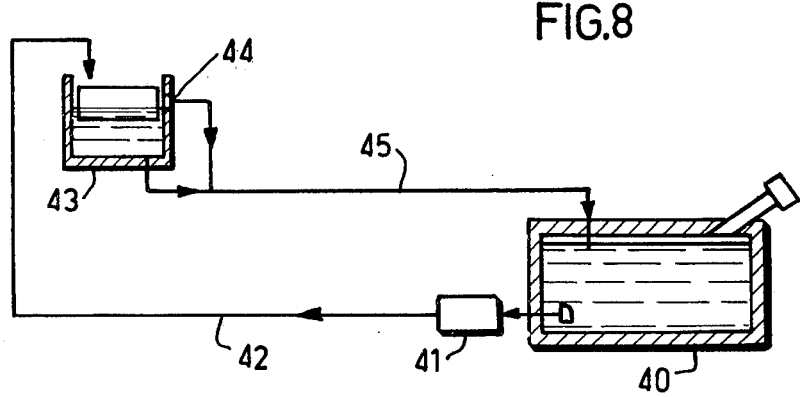
FIG. 8 shows diagrammatically a loop feed circuit for the engine of the invention.

According to the invention these phenomena are eliminated by a device feeding the engine with fuel with a looped circuit, as shown in FIG. 8.

Referring to FIG. 8, the tank 40 is carefully heat-insulated to avoid solar radiation and also reflected heat coming from road surfaces. The feed pump 41 is an electric pump of conventional type, operated on the closing of a contact and disposed as close as possible to the tank 40. The flow of the pump 41 is selected to be up to three or four times the flow consumed at full load. The pump 41 delivers into the feed pipe 42, which is also heat-insulated, although the heat insulation is not shown in the diagram in the Figure.

The carburettor 43 is of the constant level type and its float chamber is provided on its side walls with a ring of holes 44 forming an overflow, or any other system overflowing into a pipe 45 leading back to the tank 40 by gravity. The float chamber of the carburettor 43 is also provided at its base with a calibrated orifice 46 whose diameter is less than 1 mm; the orifice 46 is also in communication with the return pipe 45. The diameter of the orifice 46 is so determined as to enable the chamber to be emptied in about five seconds when the supply 42 is shut off.

It is seen that in normal operation the continuous circulation of the fuel and its recycling to the heat-insulated tank prevent its local heating beyond the boiling point of methanol and entail turbulence of the fuel mixture, thus preventing its separation. During a halt, even if the temperature is at its maximum under the bonnet, the fuel does not stagnate in the float chamber but escapes through the action of gravity by way of the orifice 46 to the heat-insulated tank 40; the carburettor is completely emptied, preventing any possibility of percolation and flooding. On restarting, the pump 41 starts to operate as soon as the contact is closed, and the flow of the pump enables the carburettor float chamber to be filled in from one to two seconds.

We claim:

1. An internal combustion engine having a pressure device for injecting fuel into the engine cylinder or cylinders, a device for adjusting the advance of the injection in dependence on the engine load, and a controlled ignition device, said engine being arranged to use a fuel comprising a product other than a petroleum product and being characterized in that the device for adjusting the injection advance supplies, at least for engine starting, a high value of advance on the order of 180°, the device for adjusting the injection advance having means for reducing the advance when the engine load increases, and the dimensional characteristics of said engine being so determined as to supply a volumetric compression ratio between 12 and 20.

2. An engine as claimed in claim 1 characterised in that dimensional characteristics of said engine are determined so as to provide a volumetric compression ratio defined by the diagram of FIG. 1 in the hatched zone of that diagram, the compression ratio being plotted on the abscissa, while a coefficient C defined by the ratio Ca/Cg is plotted on the ordinate, the said ratio being the ratio of the active stroke of the piston (Ca) to its geometric stroke (Cq).

3. An engine as claimed in claim 2, characterised in that for feeding with high pressure fuel injection the dimensions are so determined as to supply a volumetric ratio of about 16 for a value C of the order of 0.80.

4. An engine as claimed in claim 1 characterised in that said engine is fed with a fuel selected from the lower aliphatic alcohols.

5. An engine as claimed in claim 1 which is arranged to use a fuel composed of a mixture in variable porportions of a conventional petroleum product and an alcohol based product, characterised in that its dimensional characteristics are determined so as to provide a volumetric compression ratio defined by the system of curves in FIG. 7, in dependence not only on a coefficient C defined by the ratio Ca/Cg of the active stroke Ca of the piston to the geometric stroke Cg, but also in dependence on the percentage of said alcohol based product contained in the fuel mixture.

* * * * *